United States Patent
Brown et al.

(10) Patent No.: US 9,860,337 B1
(45) Date of Patent: Jan. 2, 2018

(54) MACHINE-BASED IDENTIFICATION OF CONTENT WITH DIFFERING OPINIONS

(71) Applicant: Amazon Technologies, Inc., Reno, NV (US)

(72) Inventors: Aaron Michael Brown, Seattle, WA (US); Steven Michael Reddie, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 601 days.

(21) Appl. No.: 13/829,539

(22) Filed: Mar. 14, 2013

(51) Int. Cl.
*G06F 15/16* (2006.01)
*H04L 29/08* (2006.01)
*G06F 17/30* (2006.01)

(52) U.S. Cl.
CPC ...... *H04L 67/306* (2013.01); *G06F 17/30873* (2013.01); *G06F 17/30705* (2013.01)

(58) Field of Classification Search
CPC ......... G06F 17/30705; G06F 17/30873; H04L 67/306
USPC ......................................................... 709/204
See application file for complete search history.

(56) References Cited

U.S. PATENT DOCUMENTS

| | | | |
|---|---|---|---|
| 7,096,214 B1 * | 8/2006 | Bharat et al. | 707/708 |
| 8,176,431 B1 * | 5/2012 | Scannell et al. | 715/762 |
| 8,676,596 B1 * | 3/2014 | Franson | G06Q 30/0282 705/1.1 |
| 9,201,868 B1 * | 12/2015 | Zhang | G06F 17/28 |
| 9,256,343 B1 * | 2/2016 | Stekkelpak | G06F 3/0481 |
| 2001/0029527 A1 * | 10/2001 | Goshen | 709/218 |
| 2004/0030697 A1 * | 2/2004 | Cochran | G06F 17/30861 |
| 2005/0114161 A1 * | 5/2005 | Garg | G06Q 30/0282 703/2 |
| 2005/0125216 A1 * | 6/2005 | Chitrapura | G06F 17/2785 704/1 |
| 2006/0178900 A1 * | 8/2006 | Shilo et al. | 705/1 |
| 2009/0030862 A1 * | 1/2009 | King | G06F 17/30705 706/45 |
| 2009/0228478 A1 * | 9/2009 | Steichen | G06Q 99/00 |
| 2010/0050118 A1 * | 2/2010 | Chowdhury et al. | 715/810 |

(Continued)

OTHER PUBLICATIONS

Abbasi, A. et al. "Sentiment Analysis in Multiple Languages: Feature Selection for Opinion Classification in Web Forums," The University of Arizona, ACM, 2007, 35 pages.

*Primary Examiner* — James Conaway
(74) *Attorney, Agent, or Firm* — Knobbe, Martens, Olson & Bear, LLP (57) ABSTRACT

Features are disclosed for enabling users to discover content with different opinions or sentiments regarding particular topics. In some embodiments, users may request content expressing an opinion regarding a topic that is contrary or otherwise different than the opinion expressed in a currently viewed or selected content item. A service or system can identify content items related to the same topic, analyze sentiments expressed regarding the topic, and provide the user with a listing or other data regarding content with differing opinions. In some embodiments, the service or system may proactively search for and classify content as expressing particular opinions about particular topics in the absence of a request from a user. In some embodiments, the service or system may proactively provide users with data regarding the availability of content items with contrary opinions.

23 Claims, 6 Drawing Sheets

(56) References Cited

U.S. PATENT DOCUMENTS

| | | | |
|---|---|---|---|
| 2010/0150393 A1* | 6/2010 | Ni | G06F 17/2785 |
| | | | 382/100 |
| 2010/0274775 A1* | 10/2010 | Fontes | G06F 17/30991 |
| | | | 707/706 |
| 2011/0078157 A1* | 3/2011 | Sun | G06Q 30/02 |
| | | | 707/749 |
| 2011/0137906 A1* | 6/2011 | Cai | G06F 17/2785 |
| | | | 707/740 |
| 2011/0289078 A1* | 11/2011 | Woodard | G06F 17/30884 |
| | | | 707/723 |
| 2012/0023392 A1* | 1/2012 | Cierniak et al. | 715/205 |
| 2012/0054669 A1* | 3/2012 | Refuah et al. | 715/783 |
| 2013/0018957 A1* | 1/2013 | Parnaby | G06Q 10/10 |
| | | | 709/204 |
| 2013/0145323 A1* | 6/2013 | Ward et al. | 715/835 |
| 2014/0173425 A1* | 6/2014 | Hailpern et al. | 715/256 |
| 2015/0066940 A1* | 3/2015 | Fernandes et al. | 707/740 |
| 2015/0089409 A1* | 3/2015 | Asseily | G06Q 10/10 |
| | | | 715/765 |

\* cited by examiner

MACHINE-BASED IDENTIFICATION OF CONTENT WITH DIFFERING OPINIONS

BACKGROUND

Client computing devices may be used to request content pages, data feeds, and other network-accessible information from content servers. Content pages can include text, images, videos, animations, and the like. Some portions of a content page may be devoted to textual content related to a particular topic (e.g., an article). Users may view an article and wish to view other information about the particular topic. Users can search for related articles on the same topic in order to get more recent or otherwise additional information about the topic, information from a different viewpoint or otherwise expressing a different opinion than previously read articles, etc. Some content servers include links to related content along with the articles so that users do not have to manually search for related content.

In some cases content servers, such as news services, provide portals or collections of pages related to particular categories or topics. For example, a news provider may provide a content page that summarizes recent developments in a category or topic, such as technology or politics. These pages may be updated regularly in order to include or link to articles describing current events related to the category or topic. Users can view articles from an array of news sources and other content providers, including those known to provide content from opposing points of view, in order to obtain differing opinions regarding a topic.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to providing users with information regarding a particular topic from different points of view, or content expressing differing opinions or sentiments regarding the topic. Conventionally, systems may provide tickers, portals, search result listings, and other automated or curated content listings to users wishing to access content items regarding a topic. Such listings may not identify which content items express opposing or differing opinions about the topic. In addition, it can be difficult to locate content with a differing opinion than that expressed in a currently displayed article. Furthermore, if a user obtains a listing of content relevant to a particular topic (e.g., results of a web search), it can be time consuming to determine which content items express differing opinions.

Some aspects of the present disclosure relate to identifying content regarding a particular topic, and determining an opinion or sentient about the topic that is expressed in the content. As one example, a network service may access network content items (e.g., content pages) and perform an analysis of the content to identify a topic or topics that the content describes. The network service can then process the content to determine whether the content expresses a particular opinion or sentiment about the topic (e.g., that a particular outcome of a political election is likely or desirable). Data can be stored regarding the topic of the content and any opinion expressed. An analysis of this data can then help to identify articles with different opinions about the same topic (e.g., that a different outcome of the same political election is likely or desirable).

In some embodiments, a user may use a computing device to request content from content sources via an intermediary system operated by an intermediary entity (e.g., a system between user computing devices and content sources). The intermediary can process the content retrieved on behalf of a large number of such users, identify the topic and opinion expressed or described in the content, and store data regarding the topic and opinion for future use. Content with opinions contrary to those expressed in subsequently requested content can be identified by analyzing the data produced in response to previous requests. Metadata regarding the content with contrary opinions can be provided to the user computing device along with, or separately from, the subsequently requested content item. A component of the user computing device (e.g., a web browser application) can then provide interface components for alerting the user to the existence of content with differing opinions and for providing access to such content. In some embodiments, the user computing device may not request content via an intermediary, but rather directly from content providers, content delivery networks ("CDNs"), and the like. In such cases, a network service can separately access content from the content providers and perform topical and opinion analyses. When a user of a user computing device wishes to obtain content expressing a contrary or otherwise different opinion about the topic of a currently displayed content item, a request can be sent to the network service to identify content with differing opinions. The network service can respond with data regarding content with differing opinions (e.g., linked search results, a single network address, etc.) that the user computing device can use to retrieve a content item with a differing opinion.

In some embodiments, some or all of the features described above may be incorporated into a search engine system, such as an Internet search engine system that crawls and indexes many web sites and/or other content sources. The search engine system may keep track of the topic of each content item that is crawled, and any opinion expressed in the content item. The search engine may then compare the opinions of content items associated with the same topic to identify content items with differing opinions. Based on these comparisons, the system may identify for the user, in response to a search request, content that expresses differing opinions about the topic of the search. The search engine system may proactively call such content pages (or text extracted from them) to the attention of the user, and/or may present them separately in search results when the user later conducts a related search. When a user accesses such a page, the system may also highlight the portion or portions of the page that describe the opinion about which the search engine has identified opposing or otherwise differing opinions. A search engine system or some other system may, for example, implement these features as part of a "news search" service. The search engine system can generate a personalized news page or home page for a user. The personalized news page can summarize and provide links to content with similar or diverse opinions associated with the topics of interest to the user.

Although aspects of the embodiments described in the disclosure will focus, for the purpose of illustration, on analyzing and providing articles about topics of interest, one skilled in the art will appreciate that the techniques disclosed herein may be applied to any number of services, process, or applications. For example, other textual content may be analyzed and provided to users, including blog postings, academic papers, etc. In addition, non-textual content may be analyzed and recommended or provided to users, including images, videos, and the like. Various aspects of the disclosure will now be described with regard to certain examples and embodiments, which are intended to illustrate but not limit the disclosure.

Figure 1:
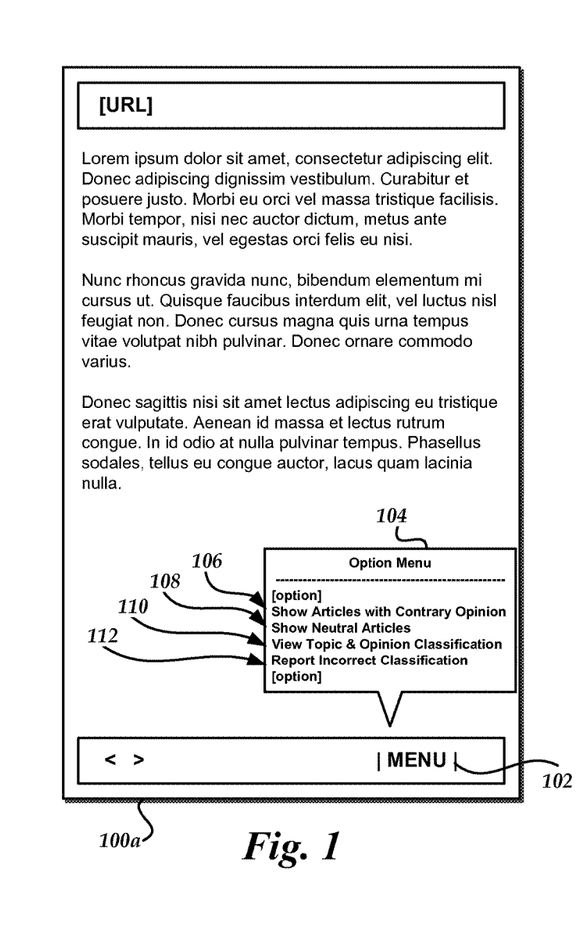
FIG. 1 is a user interface diagram of a browser displaying a content item and an illustrative menu of options for requesting content of differing opinions regarding the topic of the content item.

With reference to an illustrative embodiment, a client device may execute a browser application. A user may interact with the browser application to request content items, such as web pages or other types of documents, hosted by content servers. FIG. 1 illustrates a browser application interface 100a displaying a content item. The content displayed in the interface 100a is textual content, such as an article regarding a particular topic (e.g., a news story of interest to the user). The browser interface 100a includes a menu control 102 that can be used to display a menu 104 of options or actions that the user may take. For example, the menu 104 of FIG. 1 includes an option 106 to access articles with contrary opinions or different sentiments regarding the topic of the current article. If a user selects this option 106, a request may be sent to a network-accessible topical content service for other content, regarding the topic of the currently displayed article, which expresses a contrary opinion or otherwise different sentiment. The menu 104 of FIG. 1 also includes an option 108 to search for content regarding the topic that is neutral or otherwise does not present a strong opinion. If a user selects option 108, a request may be sent to the topical content service for content relevant to the topic of the currently displayed article, which was does not express a strong opinion.

In addition, the menu 104 shown in FIG. 1 also includes an option 110 to view topic and opinion classification information for the currently displayed content page. If a user selects option 110, the user may be presented with information that the topical content service has generated. For example, the currently displayed article may relate to a political election. Using the analytical techniques described in more detail below, the topical content service can analyze the content of the page to identify the topic. In addition, the topical content service can identify any opinion or sentiment regarding the topic that is expressed in the article. In the political election example, the topical analysis service can identify which candidate the article is predicting will win, whether a value judgment is being made about the merits of any candidate or issue, etc. When a user selects option 110, these classifications and determinations made by the topical content service can be displayed or otherwise indicated to the user so that the user can determine, e.g., which types of articles will be returned in response to selection of menu options 106 or 108. If the topical content service has identified an incorrect topic or opinion, the user can select menu option 112 to indicate the inaccuracy to the topical content service. The user may be prompted or otherwise given the opportunity to provide information regarding the inaccuracy, or a general notification regarding the inaccuracy can be transmitted to the topical content service. The topical content service can use such user feedback to adjust the topic and opinion determinations made for the currently displayed content page.

Figure 2:
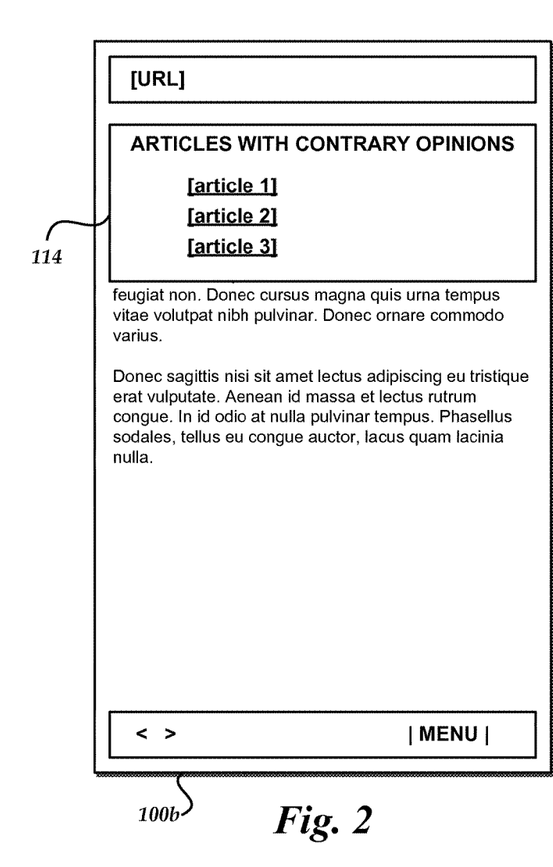
FIG. 2 is a user interface diagram of a browser displaying content that expresses differing opinions about a topic.

FIG. 2 illustrates a browser interface 100b presenting content options in response to a request from a user. As described above, a user may select menu option 106 or otherwise request that the topical content service provide the user with one or more content items that express a contrary opinion or different sentiment regarding a topic than a currently displayed content item. A listing 114 of articles with contrary opinions may be shown in response to the selection of menu option 106. The listing 114 may be generated by the browser application executing on the client device based on data received from the topical content service, such as an Extensible Markup Language ("XML") data stream. In some embodiments, the listing 114 may be generated by the topical content service and provided to the client device for display, such as with a Hypertext Markup Language 5 ("HTML 5") application. As seen in FIG. 2, the listing 114 can include links to the individual articles. In some embodiments, the topical content service may transmit the articles themselves, or portions thereof, to the client device instead of or in addition to a listing and links.

Figure 3:
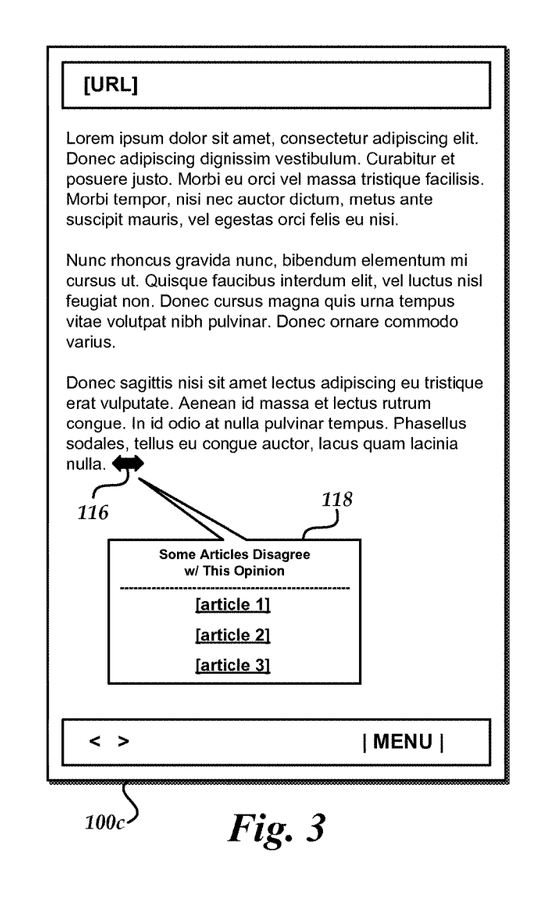
FIG. 3 is a user interface diagram of a browser displaying a content item and an indicator that other content items may express differing opinions about a particular element of the content item.

In some embodiments, users may be provided access to articles with contrary opinions regarding particular topics through means other than a specific "show articles with contrary opinion" request made while viewing an article. Users may be automatically presented with indicators of the presence of articles with differing options, search results separated by opinions, etc. As seen in FIG. 3, an icon 116 or some other indicator may be displayed by the browser application indicating the availability of contrary opinions. For example, when users view an article, the topical content service may provide metadata regarding a particular portion (e.g., section, paragraph, or sentence) of the article about which the topical content service has identified differing opinions. The browser can then display the icon 116 or some other indicator. Users may activate the icon (e.g., clicking, tapping, hovering over the icon, etc.) to display a listing 118 of articles with different opinions. The listing may include links to the listed articles.

In some embodiments, the functionality or option for viewing articles with contrary opinions can be included in applications other than browser applications, such as specialized mobile applications. For example, a news application (e.g., Flipboard) that provides user access to articles from a variety of publications (e.g., magazines, newspapers, blogs, etc.) may be configured to request or otherwise receive data regarding content with contrary opinions.

Figure 4:
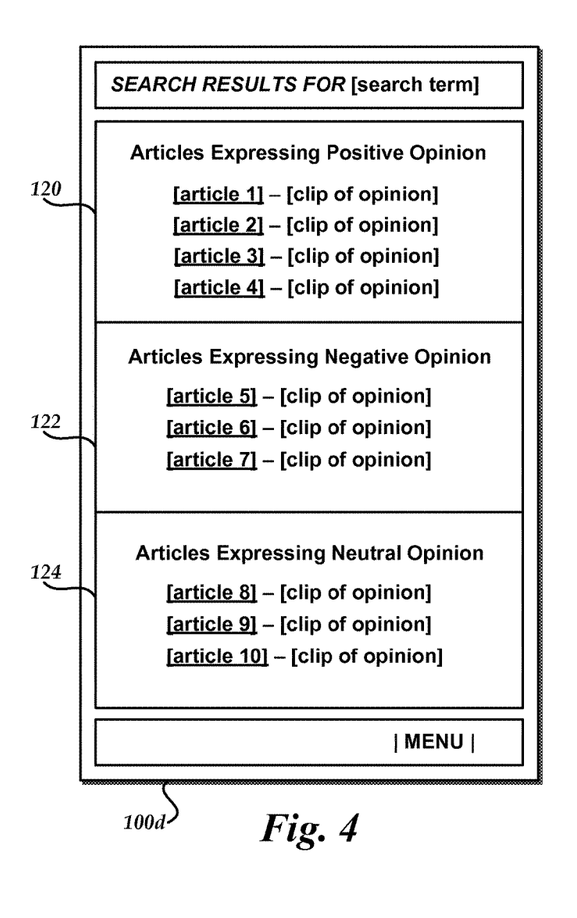
FIG. 4 is a user interface diagram of a browser displaying search results grouped according to opinion regarding a particular topic.

FIG. 4 shows a browser interface 100d displaying results of a search. Search results (e.g., individual articles and other content items) that have been determined to have particular opinions (or no opinion at all) have been separated in to groups. For example, a first listing 120 of search results includes those results that express a positive opinion regarding the topic, while a second listing 122 includes those results that express a negative opinion regarding the topic. A third listing 124 may also be presented that includes articles expressing no opinion or are otherwise substantially neutral. Users can then pick and choose which opinions to read about further, compare articles with particular opinions to articles with neutral opinions, and the like. In some embodiments, the opinions may not be categorized as "positive," "negative" or "neutral," but rather as some other categorization regarding the opinion. The listings 120, 122, 124 displayed in the search results interface may include links to articles and, in some cases, a portion of the articles themselves. For example, the listing 120 of articles expressing positive opinions regarding the particular topic may include a sentence, phrase, or summary, or some other text indicating the opinion described in the article.

Networked Content Consumption Environment

Figure 5:
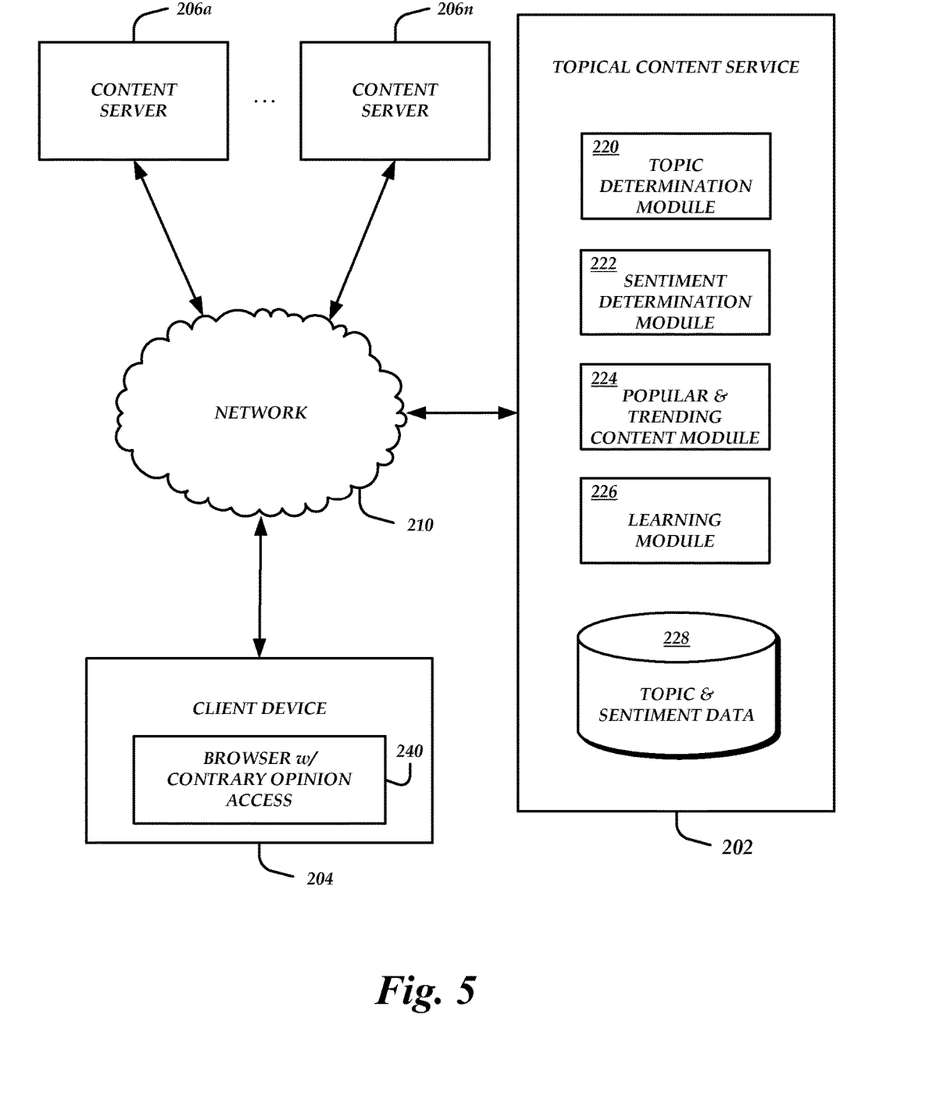
FIG. 5 is a block diagram of an illustrative content delivery environment including a client device, a topical content service, and multiple content servers.

Turning now to FIG. 5, an example content consumption environment in which features can be implemented for providing users with articles and other content relevant to a topic will be described. The content consumption environment can include a topical content service 202, a client device 204, and any number of content servers 206a-206n. The various systems may communicate with each other via a communication network 210. The network 210 may be a publicly accessible network of linked networks, possibly operated by various distinct parties, such as the Internet. In other embodiments, the network 210 may include a private network, personal area network, local area network, wide area network, cable network, satellite network, cellular telephone network, etc. or combination thereof, each with access to and/or from the Internet.

The topical content service 202 can be a computing system configured to analyze network-accessible content to determine (1) the topic or topics of the content and (2) any opinion or sentiment expressed about the topic of the content. For example, the topical content service 202 can be a server or group of servers that may be accessed via the network 210. In some embodiments, the topical content service 202 may be an intermediary system between the client device 204 and content servers 206. For example, the topical content service 202 may be an intelligent proxy server, a system operated by an internet service provider (ISP), or some other device or group of devices that retrieve content on behalf of client devices 204. In additional embodiments, the topical content service 202 is not an intermediary between the client device 204 and the content servers 206. Rather, the topical content service 202 can be a third-party system that receives data from the client device 204 regarding which content the user of the client device 204 has accessed, and uses that data to identify content relevant to the topic that expresses a different opinion than content that the user has accessed.

The topical content service 202 can include a number of components, such as a topic determination module 220 to identify the topic of a content item, a sentiment determination module 222 to identify an opinion or sentiment about the topic within a particular content item, a popular and trending content module 224 to identify which content items may be popular or increasing in popularity, a learning module 226 to process user feedback, and a topic and sentiment data store 228 to store data regarding the topics and sentiments of particular content items. The topical content service 202 may include multiple computing devices, such as computer servers, logically or physically grouped together. The components of the topical content service 202 can each be implemented as hardware, such as a server computing device, or as a combination of hardware and software. In addition, the components of the topical content service 202 can be combined on one server computing device or separated individually or into groups on several server computing devices. In some embodiments, the topical content service 202 may include additional or fewer components than illustrated in FIG. 2. For example, a single component may perform the functions of both the topic determination module 220 and sentiment determination module 222. As another example, the topical content service 202 may include or otherwise be associated with various additional computing resources, such as content servers 206, content delivery network (CDN) systems, internet service providers (ISPs), and the like.

The client devices 204 can correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 204 may be configured with a browser application 240 to communicate via the network 210 with other computing systems, such the topical content service 202 or content servers 206, and to request, receive, process, and display content. Illustratively, the browser application 240 may provide functionality for a user to access content with a contrary or different opinion than a currently displayed content item.

The content servers 206 can correspond to logical associations of one or more computing devices for hosting content and servicing requests for the hosted content over the network 210. For example, a content server 206 can include a web server component corresponding to one or more server computing devices for obtaining and processing requests for content (such as content pages) from the client device 204, the topical content service 202, or other devices or service providers. In some embodiments, one or more content servers 206 may be associated with a CDN service provider, an application service provider, etc.

In operation, one or more client computing devices 204 may be associated with a topical content service 202. For example, a user may have an account with the topical content service 202, or the browser 240 or client device 204 may be configured to exchange information with the topical content service 202. The topical content service 202 may be implemented as an intermediary system between the client device 204 and content servers 206, or it may be implemented as a third party service.

Figure 6:
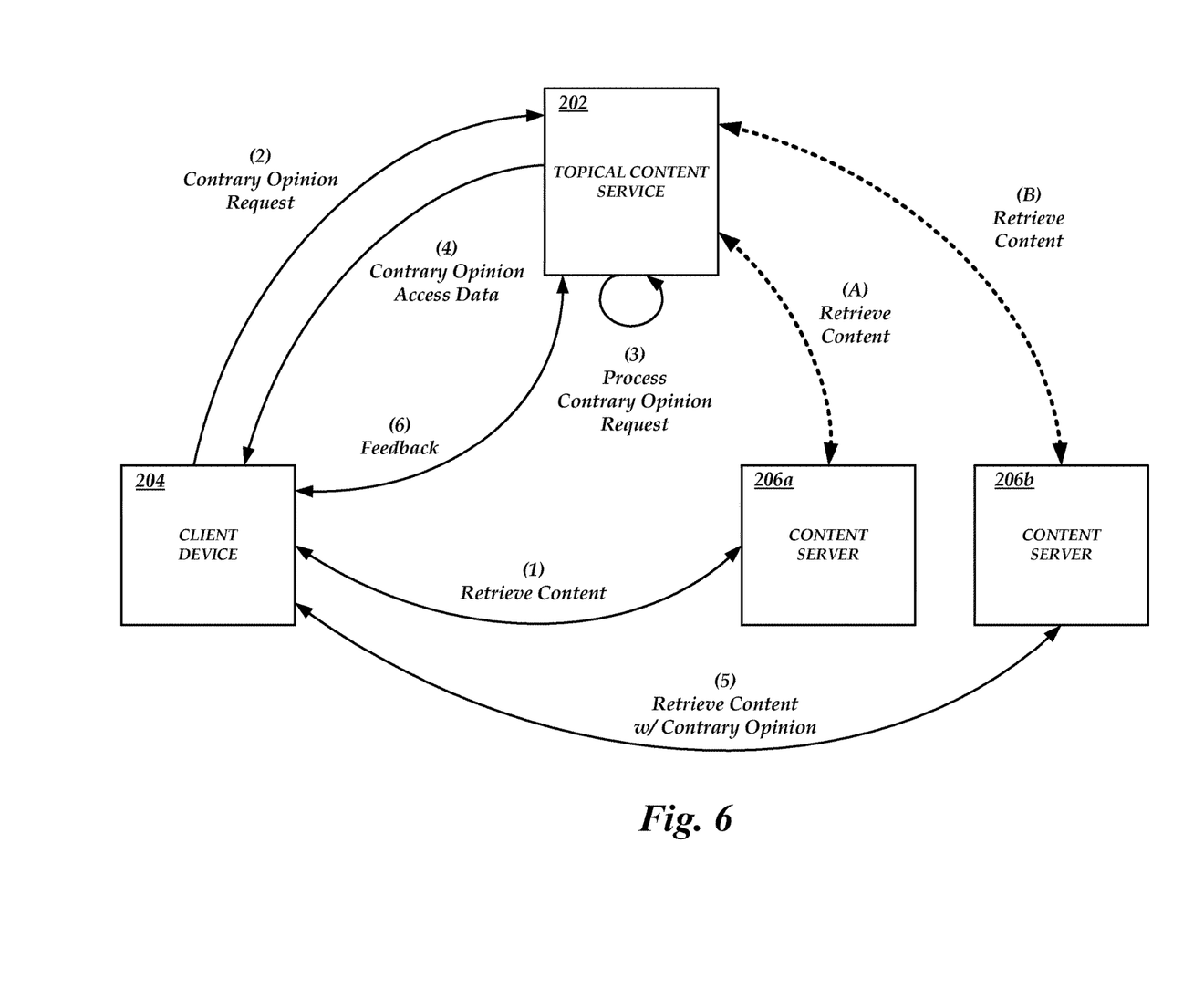
FIG. 6 is a block diagram of illustrative communications and data flows between a client device, a topical content service, and multiple content servers.

FIG. 6 illustrates examples data flows an interactions between a client device 204, a topical content service 202 implemented as a third party service (e.g., not an intermediary system), and multiple content servers 206a, 206b. The client device 204 may retrieve a content item at (1) from a content server 206a. The content item may be an electronic content item (e.g., a web page, electronic book, document, etc.) regarding a particular topic. For example, a user of the client device 204 may be viewing a content page with links to various articles, and the user may activate a link to request a news article about a particular news item or other topic.

The request may be transmitted to the content server 206a, and the content server 206a may respond with the requested content. Subsequently, the user may wish to access content regarding the same topic that presents a contrary or otherwise different opinion. The user may transmit a "contrary opinion" request or some other request for relevant content with a different point of view at (2) to the topical content service 202. As part of the request, the client device 204 may transmit data regarding the current content page that the client device 204 is presenting or the most recent content page that the client device 204 requested. In some embodiments, the browser 240 or some other component of the client device 204 may be configured to periodically transmit information to the topical content service 202 regarding content requests or currently displayed content items, rather than submitting such information in conjunction with a "contrary opinion" request.

The topical content service 202 can process the "contrary opinion" request at (3). Processing such a request may include identifying content related to the topic of the request. First, the topical content service 202 can analyze the article about which the request was submitted (e.g., the article currently displayed on the client device 204) in order to determine the topic. For example, the client device 204 may have identified the article in the request, and the topical content service 202 can obtain the article from the content server 206a and determine the topic. In some embodiments, the client device 204 may provide information regarding the topic along with the request. Next, the topical content service 202 can identify an opinion or sentiment expressed in the content item. The topical content service 202 may then perform a search for content regarding the same topic that expresses a different opinion, retrieving content from search providers or directly from content servers 206a and 206b at (A) and (B). When the topical content service 202 has a quantity of articles to process, it can use the sentiment determination module 222 or some other component to determine the sentiment expressed in those articles.

Performing a search in response to the "contrary opinion" request can help ensure that the topical content service 202 locates the most recent content with differing opinions. However, performing the search in response to the request can also introduce latencies and other processing delays that may be undesirable or unacceptable to the user of the client device 204. Accordingly, the topical content service 202 may monitor available content periodically or continuously, even in the absence of "contrary opinion" requests. For example, the topical content service 202 may use an automatic network content indexer (e.g., a web crawler) or some similar tool to retrieve content from content servers 206a and 206b at (A) and (B), in addition to any number of other servers. The topical content service 202 can use the topic determination module 220 or some other component to identify the topics of retrieved content items and determine which content items relate relates to the same or similar topics. The topical content service 202 can then use the sentiment determination module 222 or some other component to identify particular opinions expressed in those content items. In some embodiments, the topic determination module 220 may use natural language processing ("NLP") modules or algorithms to analyze articles for content and/or sentiment. Data regarding these analyses can be stored in the topic and sentiment data store 228. In this way, the topical content service 202 can have access to data about relevant content when responding to a "contrary" request without performing searches for content in-line with request processing.

The topical content service 202 can return data to the client device 204 at (4) that the client device 204 can use to access content identified by the topical content service 202. The data may include links to relevant articles, and the client device 204 can display a listing of the articles to the user, as seen in FIG. 2. If a user selects an article in the listing, the client device 204 can retrieve the article from the corresponding server at (5), such as content server 206b. In some embodiments, the topical content service 202 can return the articles themselves or summaries of the articles to the client device 204, such that the client device 204 does not need to retrieve the articles from content servers 206a, 206b.

In some embodiments, the user may submit feedback to the topical content service 202 at (6), such as through the use of voting buttons. The feedback can relate to the contrary opinion articles identified by the topical content service 202, the categorization of the content displayed at the client device 204, etc. For example, as described above, a user may access data about the topic or opinion of a currently displayed article. If the topic or opinion is incorrect, the user may submit feedback to the topical content service 202. As another example, a user may determine that the opinion in an article identified by the topical content service 202 in response to a contrary opinion request is not actually a contrary opinion, is not relevant to the appropriate topic, etc. In some embodiments, the user interface may also enable users to suggest or nominate articles that express contrary opinions, such as by submitting the URLs of such articles. The learning component 226 or some other component of the topical content service 202 can use such feedback to modify corresponding data in the topic and sentiment data store 228, to access and re-process content with the topic determination module 220 or sentiment determination module 222, etc.

Figure 7:
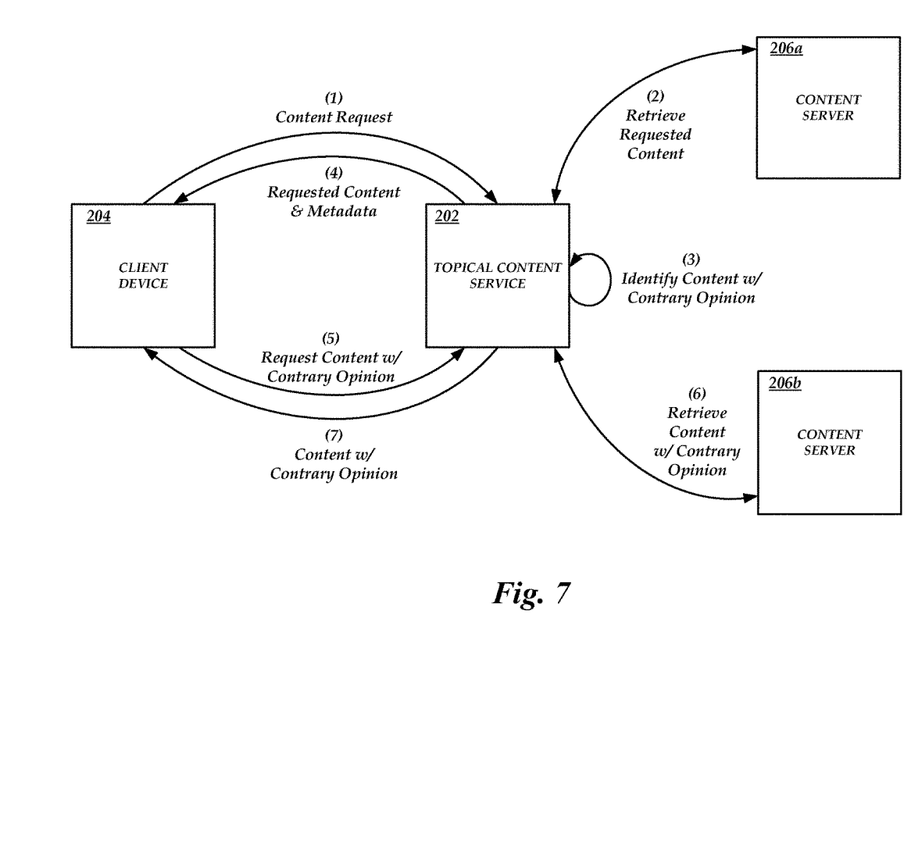
FIG. 7 is a block diagram of illustrative communications and data flows between a client device, a topical content service configured as an intermediary system, and multiple content servers.

FIG. 7 illustrates sample data flows and interactions between another embodiment of a topical content service 202, a client device 204, and multiple content servers 206a, 206b. The topical content service 202 illustrated in FIG. 7 is implemented as an intermediary system between the client device 204 (and any number of other client devices) and content servers 206a and 206b (and any number of other content servers). As an intermediary system, content requests from client devices 204 are transmitted to the topical content service 202 at (1), rather than directly to a content server 206a. The topical content service 202 can retrieve the requested content at (2) from the content server 206a on behalf of the client device 204

Due to its intermediary nature, the topical content service 202 can process content requested by the client device 204 in parallel (or serially or asynchronously) with the fulfillment of the user request for the content. For example, the topical content service 202 can process the requested content at (3) with the topic determination module 220 to categorize the content as relating to a particular topic to which other content items may also be related. The topical content service 202 can also use the sentiment determination module 222 to determine an opinion regarding the topic, and the trending and popular content module 224 to help determine which content items that are popular or increasing in popularity may be candidates for contrary opinions, etc. In parallel with identifying content with contrary opinions at (3), the topical content service 202 can transmit the requested content to the client device 204 at (4). In this way, the requested content item may be provided to the client device 204 without additional processing delay while the topical content service 202 identifies other content items with contrary opinions. Once the topical content service 202 has identified such content items, it can transmit metadata about them to the client device 204.

In some embodiments, the topical content service 202 can determine the topic and opinion in the requested content in-line (e.g., prior to transmitting the requested content to the client device 204). For example, the topical content service 202 can analyze the requested content item using the topic determination module 220, sentiment determination module 222, etc. As another example, the topical content service 202 can access data in the topic and sentiment data store 228 if the topical content service 202 has already processed the requested content item (e.g., in response to a prior request for the content from the same user or a different user). In such cases, the topical content service 202 can prepare a list of other content items regarding the same topic but which express different opinions. The topical content service 202 can then transmit metadata regarding the list to the client device 204 along with the requested content item at (3). In some cases, metadata about a list of content items regarding the same topic but expressing differing opinions can be transmitted to the client device 204 separately from the requested content item, but without a specific request for such data (e.g., before or after the requested content item, in a parallel data stream, etc.).

The client device 204 can transmit a request for a content item with a contrary opinion at (5). The topical content service 202 may retrieve the content with a contrary opinion at (6) and transmit the content to the client device 204 at (7). In some embodiments, rather than retrieving the content from the content server 206b and transmitting it to the client device 204, the topical content service 202 may summarize the content item with the contrary opinion and transmit summary data to the client device 204. In some embodiments, the topical content service 202 can summarize multiple content items and transmit a composite summary page to the client device 204.

In some embodiments, elements of the intermediary and non-intermediary implementations described above may be combined. For example, an intermediary topical content service 202 may wait until a request is received from the client device 204 for content with contrary opinions before preparing the listing or metadata for transmission to the client device. In some embodiments, an intermediary topical content service 202 may also implement a web crawler or some other component to search for and process content without receiving user requests for the content. In some embodiments, a non-intermediary topical content service 202 can monitor content requested and viewed by a client device 204 and provide contrary content listings or other metadata to the client device 204 without a specific "contrary opinion" request initiated buy a user of the client device 204. For example, the browser 240 or a browser toolbar or add-in component may be in communication with the topical content service 202.

In some embodiments the topical content service 202 can determine that a currently requested or displayed content page is associated with a sentiment score or some other measure that exceeds a threshold. In such cases, the topical content service 202 can proactively (e.g., without a request from a user) recommend a content page associated with a neutral sentiment (e.g., a content page associated with a more neutral sentiment score).

Process for Providing Data Regarding Content with Contrary Opinions

Figure 8:
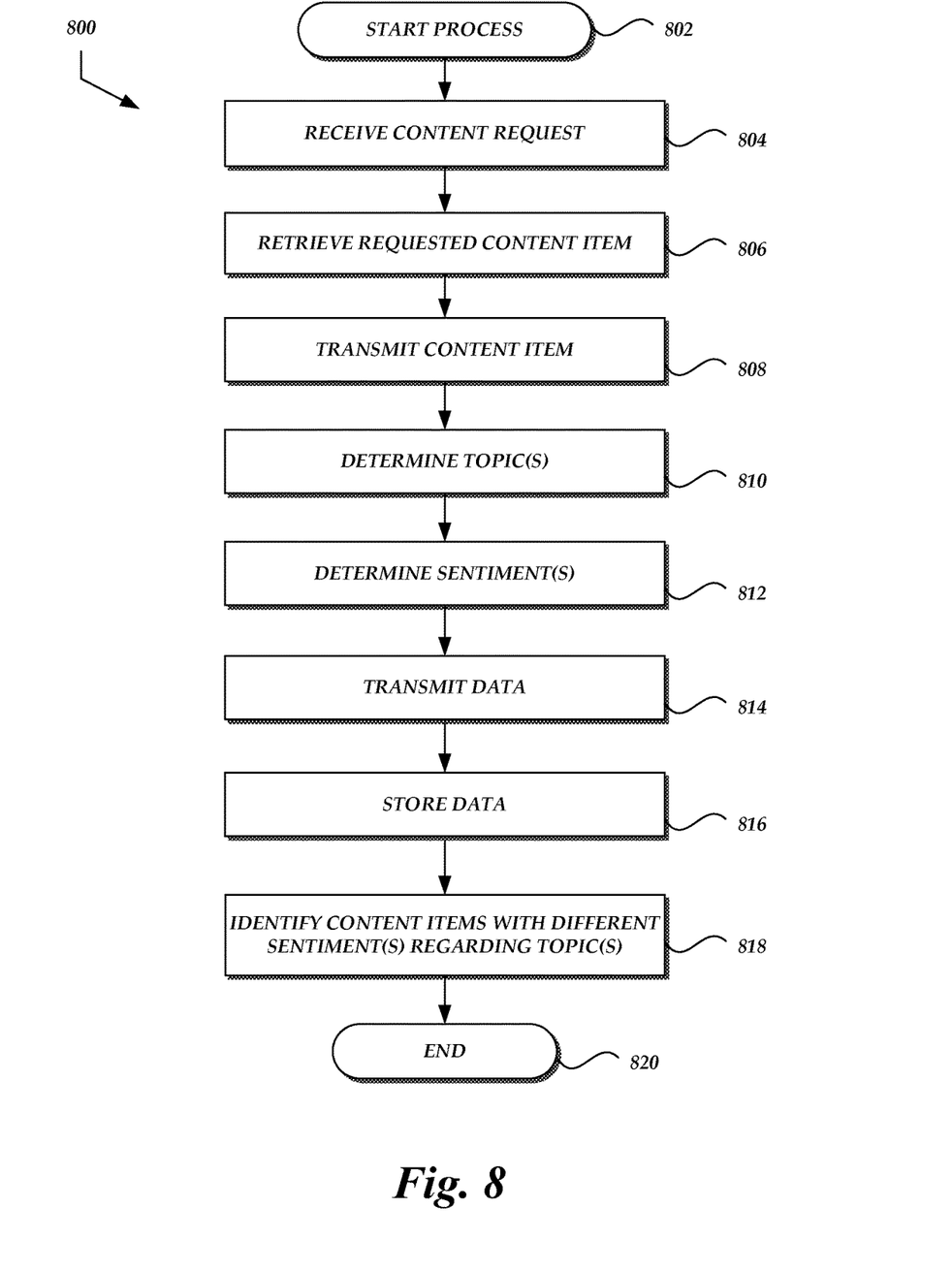
FIG. 8 is a flow diagram of an illustrative process for analyzing content to determine a topic and opinion regarding the topic, and responding to requests for content items that express different opinions.

FIG. 8 illustrates a sample process 800 for processing a content request and identifying one or more content items with contrary opinions regarding the topic of the requested content item. Advantageously, a topical content service 202 may perform the process 800 in order to proactively identify such content items and provide data regarding the identified content items to the client device 204 without a separate user-initiated request from the client device 204. In some embodiments, the process 800 may be performed only for particular sources of editorial content (e.g., weblogs, editorial sections of news publications, etc.). Selectively analyzing topics and sentiments, based on the source of the content, can conserve time and computing resources.

The process 800 begins at block 802. At block 804, the topical content service 202 may receive a request, from a client device 204 for a content item (e.g., in intermediary-system implementations), or a notification that a particular content item has been accessed (e.g., in third-party implementations). If the topical content service 202 receives a request for a content item at block 804, rather than an access notification, the topical content service 202 can retrieve the requested content item at block 806 and transmit it to the client device 204 at block 808.

At block 810, the topic determination module 220 or some other component of the topical content service 202 can determine the topic or topics in the requested content item. One method of determining the topic of a content item is to identify the source of the article or a location or classification of an article within a particular content source, such as a publication or web site. For example, the high-level topic (e.g., finance, politics, sports, etc.) of many content items can be quickly or easily determined with a high degree of confidence based solely on the source of the content (e.g., financial news providers, political weblogs, sports-related content providers, etc.).

Another method of determining the topic of a content item is to compare the content item to other content items and identify similarities between the content items. For example, a topic determination module 220 can analyze the requested content item in comparison with other content items and determine which topics the requested content has in common with one or more other content items. Data may be stored in the topic and sentiment data store 228 associating the requested content item with the topic(s). In many cases, a particular content item, such as an article, can be associated with multiple topics because such content items may include a substantial or otherwise non-trivial discussion of more than a single topic or idea. As another example, a topical content service 202 can use document search techniques, pattern-matching techniques, and the like to classify a content item as relating to one or more particular topics.

At block 812, the sentiment determination module 222 or some other component of the topical content service 202 can determine the sentiment or sentiments expressed in the content item regarding the topic(s) identified in block 810. One method of determining a possible sentiment in a content item is to identify the author or other source of the content. Many authors have consistent opinions regarding particular topics, and these opinions can be learned by analyzing a subset of their publications, receiving user feedback, etc. For example, a database can be automatically or manually created that categorizes particular authors and publications in terms of their political views, and this database can be used during the sentiment analysis process. User feedback collected over time for a particular article or article pair (e.g., a first requested article and a second article provided in response to a request for contrary opinions) can also be incorporated into the sentiment analysis process.

Sentiment analysis techniques, such as "bag of words" analysis, latent semantic analysis ("LSA"), and support vector machines ("SVM"), may be used to process the content of the requested content item to determine a sentiment expressed in the content, such as whether the article expresses a positive or negative sentiment about the topic. In "bag of words" analysis, a scoring algorithm can be created which assigns positive and negative weights to various words or phrases, and then analyzes texts for the presence of those glyphs to score a document. A Bayesian bag of words model may be used which estimates a probability, based on a known data set, that a particular article or other content item is in one of two corpuses (e.g., "positive" articles or "negative" articles). For example, a first article regarding a political election may indicate that candidate A is likely to win the election. The article may be determined to express a positive sentiment about the topic of candidate A winning the election. This may be so even if the content of the article is substantially negative about candidate A overall. Any negative statements about candidate A's view on a particular issue can indicate a negative sentiment about that particular topic, even though the article is associated with a positive sentiment about candidate A winning the election. A second article may also discuss the same political election. However, the second article may indicate that candidate B is likely to win the election. The second article may be determined to express a positive sentiment about the topic of candidate B winning the election, and also a negative sentiment about candidate A winning the elections.

LSA may be used to described relationships between parts of a croups (e.g., one document or multiple documents analyzed together) by assuming that words that are close in meaning or sentiment will occur in similar pieces of text. The corpus is analyzed to determine the occurrence of words in sections of the corpus. Based on this analysis, a matrix of word occurrences may be constructed. Singular Value Decomposition ("SVD") may be used to reduce the matrix while preserving textual relationships. The angle between vectors described by various terms may be analyzed, and terms with vector angles closer to zero are more closely related (e.g., express similar sentiments) than other terms.

The sentiment analysis techniques described above are illustrative only, and are not intended to be limiting. In some embodiments, other techniques (e.g., other specific sentiment analysis algorithms, general machine learning approaches, etc.) may also be used.

In some embodiments, the sentiment determination module 222 may track and score statements made in the content item regarding the topic to determine whether the article expresses a positive or negative sentiment about the topic. For example, each positive statement (e.g., that the candidate is right about a particular issue) may result in 1 point being added to the sentiment score. For each negative statement (e.g., that the candidate is wrong about the issue), 1 point may be subtracted from the sentiment score. After processing article, the sentiment regarding the topic may be stated in terms of the total score (e.g., +X or −X, where X is some number). Content items may be classified as having a neutral sentiment or opinion if the total score is within some threshold of zero (e.g., between +2 and −2). In some embodiments, the sentiment determination module 222 may identify three or more distinct sentiments about a particular topic, rather than identifying only positive or negative sentiments.

At block 814, the topical content service 202 can store data in the topic and sentiment data store 228 regarding the topic(s) and sentiment(s) determined above. At block 816, the topical content service 202 can identify content items with different sentiments. The topical content service 202 can query the topic and sentiment data store 228 for previously processed content items that express contrary sentiments regarding the same topic or topics discussed in the requested content item. Returning to the example above, the second content item associated with a negative sentiment about candidate A winning the election may be considered to have a contrary opinion regarding the topic of candidate A winning the election than the first article, which expressed a positive sentiment about candidate A winning the election.

A listing of the top N articles with contrary opinions may be generated at block 814, where N is some predetermined or dynamically determined integer. The articles selected for the list may be those with sentiments determined to be the most contrary (e.g., those with the largest difference in sentiment score), those that are the most popular or fastest trending, etc. In some embodiments, articles may have to meet some traffic threshold in order to be included in the list (e.g., at least 10 requests within the last hour) so that articles that are not widely read or are otherwise considered to be unreliable or unimportant are not provided to a user. In some embodiments, only the single most contrary opinion may be identified at block 816, or only the most popular content item that has a contrary opinion, etc.

At block 818, the topical content service 202 can transmit data to the client device 204 identifying or providing network addresses of content items with contrary opinions regarding the topic(s) of the currently requested article.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by one or more processors or computing devices, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

For example, the processes described with respect to FIGS. 8 and 9 may be embodied in a set of executable program instructions stored on a computer-readable medium, such as one or more disk drives, of the computing system with which the topical content service is associated. When a process is initiated, the executable program instructions can be loaded into memory, such as RAM, and executed by one or more processors of the computing system. In some embodiments, the computing system may include multiple computing devices, such as servers, and the processes may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system that acts as an intermediary between user computing devices and content sources, the computer system comprising at least one or more computing devices, each of the one or more computing devices comprising a processor and a memory, wherein the computer system is programmed to at least:

retrieve a plurality of requested content pages in response to a plurality of requests from user computing devices;

generate opinion data regarding one or more of the plurality of requested content pages, wherein opinion data regarding a particular content page of the plurality of requested content pages reflects an opinion in the particular content page regarding a topic of the particular content page, and wherein the opinion data regarding the particular content page further reflects a classification of the opinion as one of a positive opinion, a neutral opinion, or a negative opinion regarding the topic of the particular content page;

transmit, to a first user computing device, a first content page reflecting a first opinion regarding a first topic, wherein the first user computing device presents the first content page with an option to access a content page associated with an opinion regarding the first topic differing in classification from the first opinion;

receive, from the first user computing device, a request corresponding to activation of the option;

identify, based at least partly on the opinion data, a second content page associated with a second opinion regarding the first topic that differs from the first opinion regarding the first topic, wherein identifying the second content page comprises determining that a classification of the second opinion, as one of a positive opinion, a neutral opinion, or a negative opinion, regarding the first topic is different than a classification of the first opinion regarding the first topic;

transmit, to the first user computing device, response data regarding the second content page, wherein the first user computing device is configured to provide a user interface option to submit feedback, to the computer system, regarding at least one of the first opinion or the second opinion, and use the feedback to classify at least one of the first opinion or the second opinion.

2. The computer system of claim 1, wherein the response data comprises one of: at least a portion of the second content page, or a summary of at least a portion of the second content page.

3. The computer system of claim 1 further programmed to:

identify, based at least partly on the opinion data, a plurality of differing opinion content pages associated with opinions regarding the first topic that differ from the first opinion regarding the first topic.

4. The computer system of claim 3, wherein the response data comprises data regarding the plurality of differing opinion content pages.

5. The computer system of claim 1, wherein generating the opinion data comprises using, to process one or more of the plurality of requested content pages, at least one of: a sentiment analysis algorithm or a natural language processing algorithm.

6. A method of identifying different opinions in network content, the method comprising:

generating opinion data regarding a plurality of content pages retrieved from a plurality of content sources, wherein opinion data regarding each content page reflects an opinion in the content page regarding a topic of the content page, and wherein opinion data regarding each content page further reflects a classification of the opinion as one of a positive opinion, a neutral opinion, or a negative opinion regarding the topic of the content page;

providing, to a client computing device, a first content page reflecting a first opinion regarding a first topic, wherein the client computing device presents the first content page with a first option to access a content page associated with an opinion regarding the first topic differing in classification from the first opinion;

receiving, from the client computing device, data corresponding to activation of the first option;

identifying, based at least partly on the opinion data, one or more content pages associated with opinions regarding the first topic, the opinions differing in classification, as one of a positive opinion, a neutral opinion, or a negative opinion, from a classification of the first opinion;

providing, to the client computing device, a second content page of the one or more content pages, the second content page associated with a second opinion differing in classification from the first opinion, wherein the client computing device presents a second option to submit feedback regarding at least one of the first opinion or the second opinion; and using the feedback to classify at least one of the first opinion or the second opinion;

said method performed in its entirety by a computing system that comprises one or more computing devices.

7. The method of claim 6, further comprising determining that the first content page reflects the first opinion regarding the first topic asynchronously with providing the first content page to the first client computing device.

8. The method of claim 6, wherein generating opinion data comprises retrieving at least a portion of the plurality of content pages using an automatic network content indexer.

9. The method of claim 6, wherein the computing system acts as an intermediary between client computing devices and content sources.

10. The method of claim 9, wherein generating opinion data comprises retrieving at least a portion of the plurality of content pages in response to content requests received from client computing devices.

11. The method of claim 6, wherein the differing opinion data comprises one of: at least a portion of a content page of the one or more content pages, a summary of at least a portion of a content page of the one or more content pages, or a list of the one or more content pages.

12. The method of claim 6, wherein generating opinion data for a content page comprises processing the content page using at least one of: a sentiment analysis algorithm or a natural language processing algorithm.

13. The method of claim 6, wherein generating opinion data for a content page comprises processing the content page using at least one of: bag of words analysis, latent sentiment analysis, or support vector machines.

14. The method of claim 6, wherein generating opinion data for a content page comprises associating a score with the content page, the score based on one or more portions of the content page regarding the topic.

15. The method of claim 6, further comprising:
receiving, from the client computing device, a request for the first content page; and
retrieving, from a first content source, the first content page on behalf of the client computing device.

16. The method of claim 15, further comprising:
transmitting, to the client computing device, the differing opinion data in conjunction with the first content page.

17. The method of claim 6, further comprising:
receiving, from the client computing device, a request for the differing opinion data, wherein the one or more content pages are identified in response to the request.

18. The method of claim 6, further comprising:
receiving, from the client computing device, a search request, wherein the first content page and the one or more content pages are identified in response to the search request, and wherein the differing opinion data comprises search results.

19. A non-transitory computer storage medium comprising a browser component configured to execute a process on one or more computing devices, the process comprising:
providing a first user interface option to access content associated with an opinion that differs in classification, as one of a positive opinion, a neutral opinion, or a negative opinion, from a classification of a first opinion, of a first content page displayed by the browser component, regarding a topic of the first content page, wherein the first opinion is classified as one of a positive opinion, a neutral opinion, or a negative opinion regarding the topic, wherein a network-accessible computer system stores opinion data classifying the topics of a plurality of content pages from a plurality content sources;

in response to activation of the first user interface option, receiving, from the network-accessible computer system, response data comprising a second content page associated with a second opinion regarding the topic of the first content page, wherein the network-accessible computer system transmits the second content page upon identifying that the second opinion differs in classification from the first opinion as one of a positive opinion, a neutral opinion, or a negative opinion; and providing a second user interface option to submit feedback, to the network-accessible computer system, regarding at least one of the first opinion or the second opinion, wherein the network-accessible computer system uses the feedback to classify at least one of the first opinion or the second opinion.

20. The non-transitory computer storage medium of claim 19, wherein the response data comprises one of: at least a portion of the first content page, a summary of at least a portion of the first content page, or a network address of the first content page.

21. The non-transitory computer storage medium of claim 19, the process further comprising:
causing, in response to receipt of the response data, presentation of at least one of: at least a portion of the first content page, a summary of at least a portion of the first content page, or a user interface option to retrieve the first content page.

22. The non-transitory computer storage medium of claim 19, wherein the browsing component comprises one of: a browser toolbar or a browser add-in.

23. The non-transitory computer storage medium of claim 19, wherein the process further comprises providing a second user interface option to submit information regarding a content page associated with an opinion differing in classification from the displayed content page.

* * * * *